Nov. 8, 1938.　　　　A. C. HARDY　　　　2,136,340
PRINTING PLATE
Filed Feb. 17, 1937　　　3 Sheets-Sheet 1
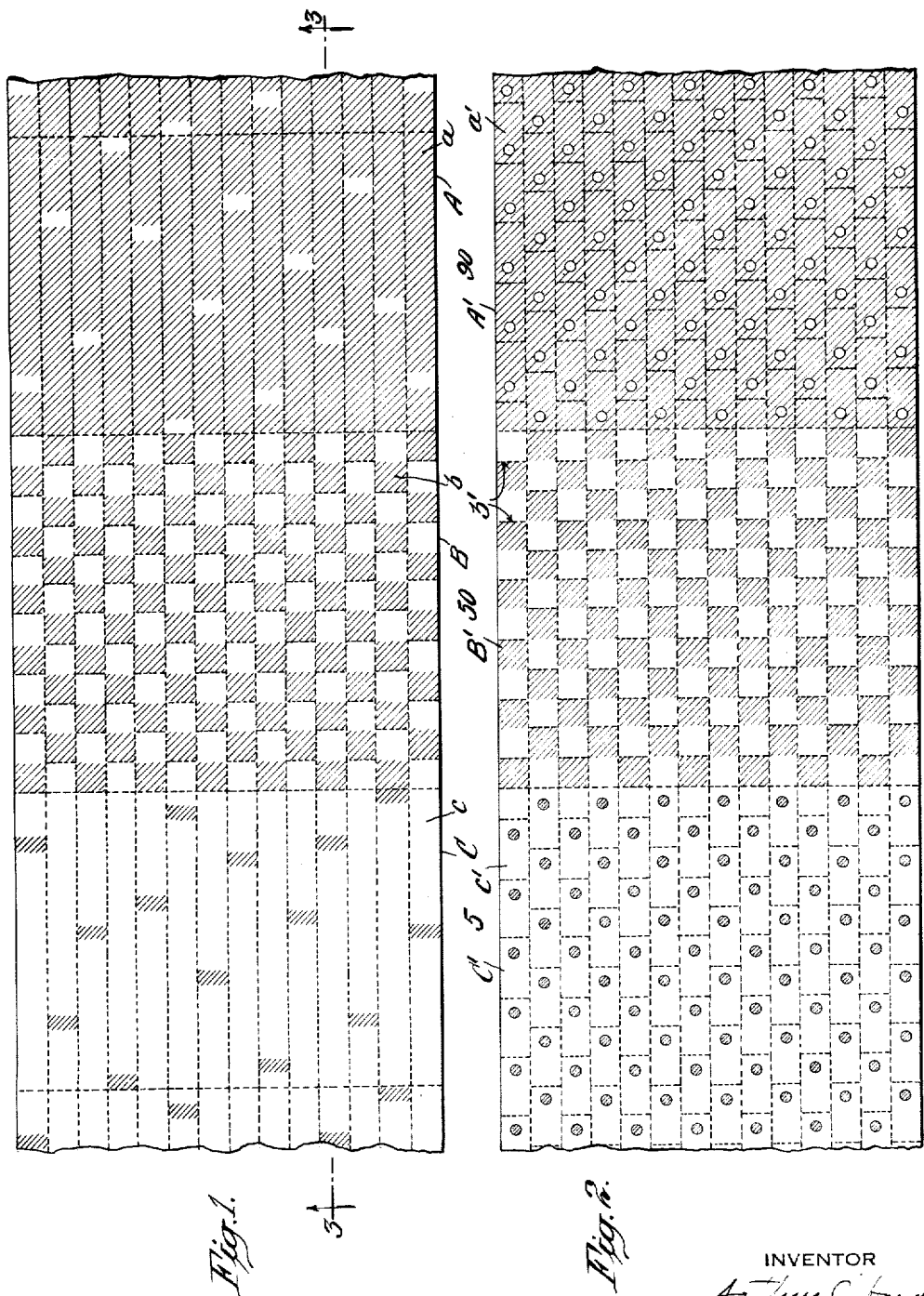
INVENTOR
Arthur C. Hardy
BY Robert W. Byerly
ATTORNEY

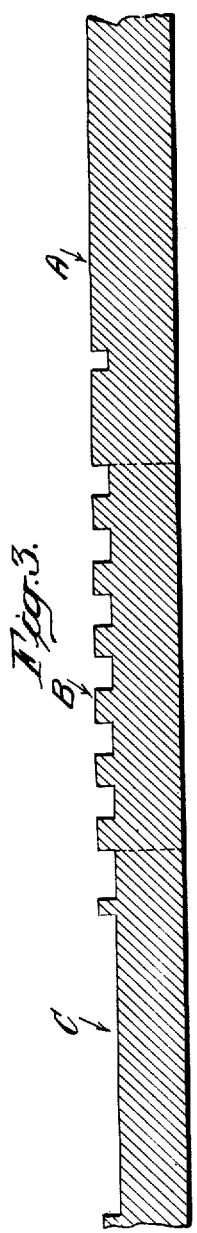
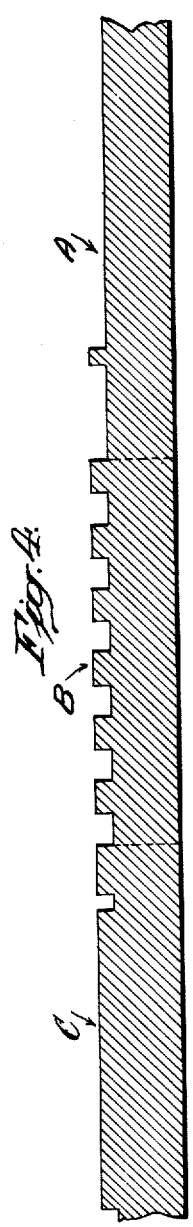
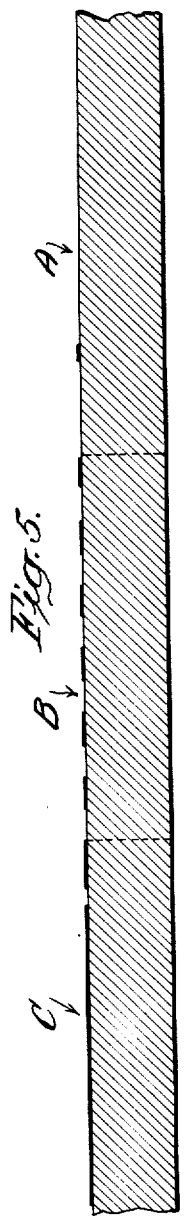

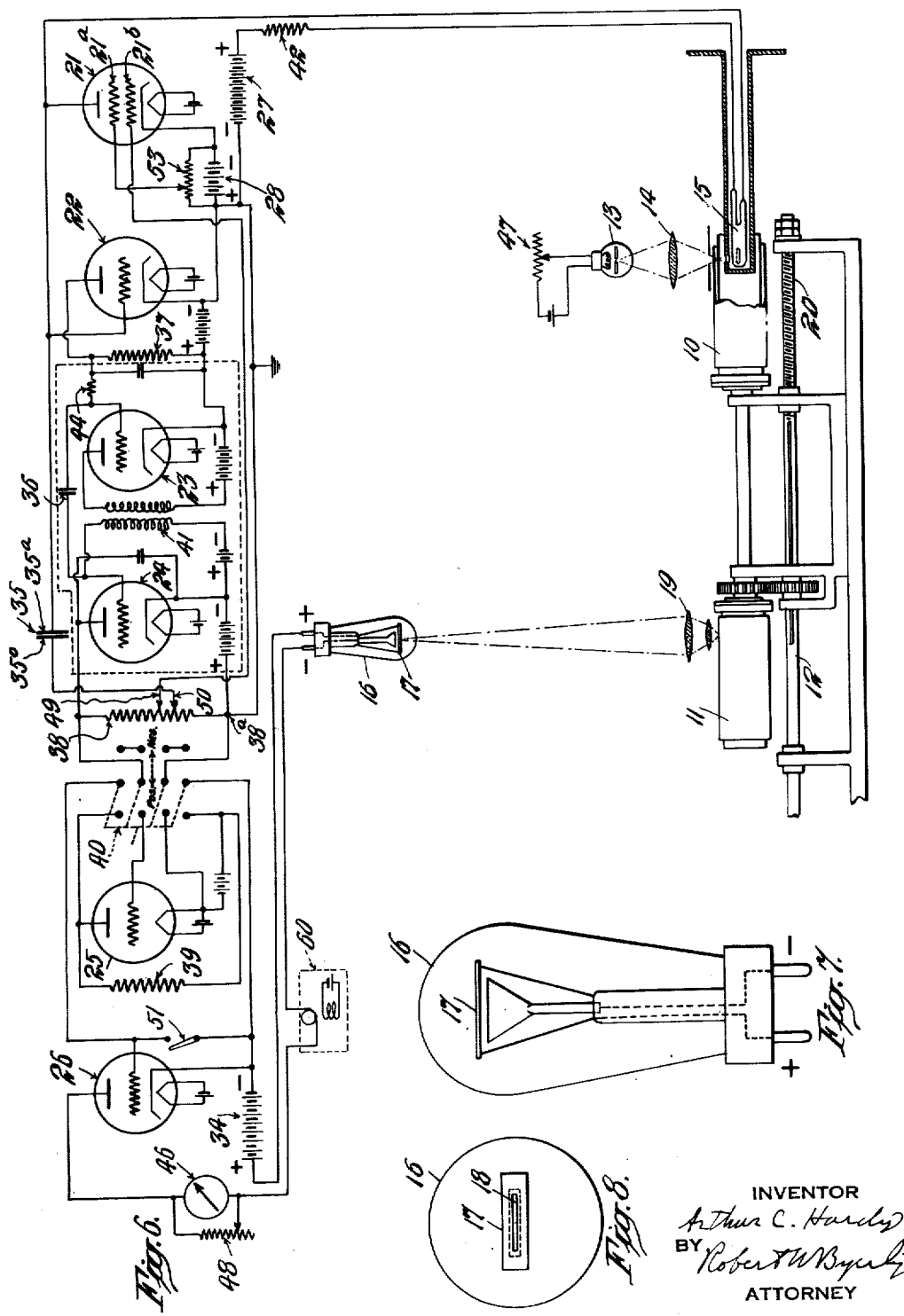

Patented Nov. 8, 1938

2,136,340

UNITED STATES PATENT OFFICE 2,136,340

PRINTING PLATE

Arthur C. Hardy, Wellesley, Mass., assignor to Interchemical Corporation, New York, N. Y., a corporation of Ohio Application February 17, 1937, Serial No. 126,110

14 Claims. (Cl. 178—7.4)

This invention relates to printing plates, to contrast images for making printing plates, and to methods and apparatus for making such contrast images.

The invention aims to provide a printing plate from which one may make prints containing printed and unprinted areas so proportioned and arranged as to give to the eye the effect of the variations in tone of an original subject or a continuous-tone photographic image thereof. Such a print I shall term a "contrast image" of the original to indicate that it contains only two contrasting tones, variations in the areas of which are utilized to simulate continuous variation in tone. Although such a print may be made with ink of any color on paper of any color, I shall, for convenience, term the two tones of the contrast image "black" and "white", using black to refer to the inked areas of the print and white to refer to the uninked areas.

Printing plates are ordinarily made photochemically. This involves making a photographic contrast image of the original, which may be made either directly in a resist applied to a metal plate to control the etching of the plate or may be made as a positive or negative photographic plate or film and then transferred to the resist by contact printing. To simplify the description which follows, I shall, in the case of all such contrast images used in making printing plates, apply the term "black" to the areas of each image which correspond to areas to be inked in printing, and apply the term "white" to the areas of each image which correspond to the areas which will be left uninked in printing. In general, in a positive image on a photographic plate, I shall term the transparent areas "white" and the opaque areas "black". In a negative on a photographic plate, I shall term the transparent areas "black" and the opaque areas "white". In a resist on a plate to be engraved for letter-press printing, I shall term the hardened areas "black" and the unhardened areas "white", and in a resist for engraving an intaglio plate, I shall term the unhardened areas "black" and the hardened areas "white".

In order that a contrast image may give to the eye the effect of the tone variations of a continuous-tone image, the black and the white areas are so arranged and proportioned that the ratio of black area to white area corresponds to the tone of the original in each part of the contrast image. The area of the contrast image thus consists of a large number of small elemental areas, each of which includes a black area and a white area so proportioned that the ratio of the size of the black area to the size of the whole elemental area corresponds (more or less closely according to the method used) to the tonal value of the area of the continuous-tone original corresponding to this elemental area of the contrast image. In order to save repetition and to simplify the terminology used in this application, I shall refer to such an elemental area in which the ratio of black area to the total area corresponds to the value of the tone of the corresponding area of the continuous-tone original as an "element" of the area of the contrast image.

Contrast images for making printing plates have customarily been made by photographing a subject or a continuous-tone image of the subject through a half-tone screen. Methods involving photo-electric scanning have also been suggested. The effect of all the customary methods, including the most customary one of photographing through a half-tone screen, is to make the elements of the area of the contrast image of uniform size. This method is satisfactory in representing the middle tones of the original; but it has proved unsatisfactory in representing both the tones which are much darker than the middle tones and the tones which are much lighter than the middle tones, because it requires the use of excessively small white dots and black spots, and uncontrollable variations in the sizes of very small black dots or white spots necessarily occur during etching and during printing.

By my invention, I have avoided the difficulties and disadvantages caused by the presence of very small black dots and very small white spots in ordinary contrast images, and in the printing plates made therefrom. A contrast image embodying my invention differs from those heretofore made, in that its elements (that is, its elemental areas wherein the ratio of black to white corresponds to the tone of the original) are not of uniform size, but, on the contrary, are relatively large in both the dark- and the light-tone parts of the image as compared to their size in the middle-tone parts; and, in that the ratio of black to white in each element is made to correspond accurately to the tone of the corresponding area of the original by means of black areas and white areas of not less than a predetermined minimum size, which may be made great enough to avoid the difficulties in etching and printing which are created by the use of very small black dots and white spots.

In describing my invention in detail, I shall refer to the accompanying drawings, in which Fig. 1 is a greatly enlarged view of part of a contrast image, or diagrammatic face view of part of a printing plate, embodying my invention;

Fig. 2 is a similar view of the corresponding part of a contrast image or printing plate made by the ordinary half-tone process;

Figs. 3, 4 and 5 are enlarged fragmentary elevations of printing plates whose printing surfaces are diagrammatically represented by Fig. 1, Fig. 3 being a relief printing plate, Fig. 4 an intaglio printing plate and Fig. 5 a lithographic printing plate;

Fig. 6 is a diagrammatic view of an electro-mechanical scanning apparatus which may be used in making contrast images embodying my invention;

Fig. 7 is an enlarged elevation of the recording light shown in Fig. 6; and

Fig. 8 is an end view of this light.

Figs. 1 and 2 show three parts A, A', B, B', and C, C', of two contrast images representing respectively a dark tone, a middle tone and a light tone of an original or a continuous-tone image of an original. The tonal value of the tone represented by the parts A and A' is 95, of the tone represented by the parts B and B', 50, and of the tone represented by the parts C and C', 5. The shading in these two views represents black areas in the sense hereinabove defined, while the unshaded areas represent white areas. The elements of the two contrast images (that is, the elemental areas in which the ratio of black to white corresponds to the tonal value of the corresponding area in the original) are outlined by dotted lines in Figs. 1 and 2 and identified by the symbols a, b and c in Fig. 1 and a', b' and c' in Fig. 2. In the middle tone parts, B and B', of each contrast image, each element b, b' consists of black and white areas of equal size. In the contrast image made by the ordinary half-tone process, shown in Fig. 2, the elements a', of the dark-tone area A' and the elements c', of the light-tone area C' are of the same size as the elements b' of the middle-tone area B'. Consequently, the white areas in the elements a' and the black areas in the elements c' take the form of small spots or dots each having an area equal to only one-twentieth of one size of the element. For still darker or lighter tones, it is apparent that the spot or dot in each element must be made still smaller.

The contrast image which I have invented differs from an ordinary half-tone image in that the elements a of the dark-tone area A are much larger than the elements b of the middle-tone area B; and the elements c of the light-tone area C are also larger than the elements b. As the result of the increased size of the elements of the dark-tone area A, each element a can include black and white areas having a ratio equal to 95% without the use of excessively small white areas; and in the same way the use of excessively small black areas in the light-tone area C is avoided.

In the contrast image embodying my invention shown in Fig. 1, it is to be understood that areas representing the tones between 95 and 50 consist of elements of a size intermediate between the size of the elements a and the elements b, and that such elements contain white areas somewhat larger than the white spots in the elements a and somewhat smaller than the white spots in the elements b. In tones darker than 95, the size of the elements is increased to a size greater than that of the elements a, but the size of the white area in such elements is maintained substantially equal to the size of the white areas in the elements a, which represent the minimum-size white areas used in my contrast image.

In the same way, areas representing tones between 50 and 5 consist of elements intermediate in size between the elements b and the elements c, containing black areas larger than those contained in the elements c and smaller than those contained in the elements b; but, in tones lighter than 5, the size of the elements is increased above the size of the elements c, while the size of the black areas which they contain is not decreased. In the particular form illustrated, the minimum size of the white areas and the black areas is the same, but this is not essential as each minimum may be made such as is necessary to secure in varying results with any particular method of etching and of printing which is to be used.

From a comparison of the Figs. 1 and 2, it is apparent that while the contrast image of my invention resembles an ordinary half-tone contrast image in the middle-tone parts of the image, it differs radically from the ordinary half-tone contrast image in the parts representing tones which are either darker or lighter than the middle-tones. The light-tone parts of my image and of an ordinary half-tone image both consist of a white area containing isolated black areas but in the half-tone image the isolated black areas in the light-tone parts are separated by the same distance (from center to center) as the black areas in the middle-tone part, while in my image, the isolated black areas are more widely separated in the light-tone parts than are the black areas in the middle-tone parts, and they are separated more and more widely as the tone becomes lighter. A similar difference between my contrast image and the ordinary half-tone contrast image exists in the spacing of the isolated white areas which occur in the black area representing tones darker than the middle tones.

It should be understood that my invention includes a contrast image such as that shown in Fig. 1 whether positive or negative, and whether made on a photographic plate or film or directly on a resist. My invention includes also a printing plate made from such an image. Fig. 1 may be regarded as a diagrammatic face view of a relief printing plate shown in Fig. 3, in which case the shaded portions represent projections and the unshaded portions represent indentations; or Fig. 1 may be regarded as representing an intaglio printing plate shown in Fig. 4, in which case the shaded portions represent indentations and the white portions represent the unindented areas of the plate; or Fig. 1 may be regarded as a lithographic plate shown in Fig. 5, in which case the shaded portions represent greasy areas and the white portions represent water wetable areas. Such contrast images and printing plates are, however, not claimed in the present application as they form the subject-matter of my divisional applications, Serial Nos. 202,177 and 202,178, filed April 15, 1938.

My invention includes a method and apparatus for making a contrast image of a character such as that shown in Fig. 1.

An embodiment of the apparatus features of my invention is shown in Fig. 6. It includes an ordinary electro-mechanical scanning apparatus having a transparent picture drum 10 and a recording drum 11, which are given identical rotational and longitudinal movements through a driving mechanism 12. A constant intensity lamp 13 regulated by resistance 47 and provided with a suitable lens system 14 is mounted to scan a continuous-tone transparent original or a continuous-tone transparent photograph of an original mounted on the drum 10. The light from the scanning lamp 13, as modified by passing through the transparent original, is received by a photo-electric cell 15. The mechanical arrangement shown in Fig. 6 is merely illustrative and not essential as other known forms of scanning apparatus including such as are designed to scan an opaque original may be used in carrying out my invention.

A recording lamp 16 illuminating a shield 17 containing a long narrow slit or aperture 18 is provided with a lens system 19 which focuses an image of the slit 18 on a recording film placed on the drum 11. In the form illustrated in Fig. 7, the shield 17 containing the slit 18 is the anode of the lamp, but this is not essential as the shield containing the slit may be separate from the lamp. The lamp is a gas-discharge lamp having no afterglow. The length of the image of the slit 18 is equal to the distance between the turns of the screw 20 of the driving mechanism, so that, as the mechanism operates, the image of the slit scans the entire area of the recording film without any overlap. The length of the image of the slit 18 on the recording film determines the width of the elemental areas of the contrast image produced on the recording film. In this connection, it should be noted that the elemental areas a, b, c shown in Fig. 1 are all of the same width. The lengths of the elemental areas are determined by the time length of the cycle of the recording lamp 16; and the proportion of black and white which each elemental area contains is determined by the time during which the recording lamp 16 is lighted and the time periods during which it is extinguished during one cycle. These time periods are controlled by the light passing through the original to the photo-electric cell 15 by means of interconnecting electric circuits between the photo-electric cell 15 and the recording lamp 16.

The interconnected electric circuits include a photo-cell circuit which charges a condenser 35, a constant current circuit which discharges the condenser 35, a trigger circuit actuated by the voltage across the condenser 35, and a control circuit for the recording lamp 16 actuated by the trigger circuit. The circuits are so interconnected that the condenser 35 is alternately charged and discharged in a cycle controlled by the amount of light reaching the photo-cell 15 and controlling the cycle of the recording lamp 16 and thus the length and character of the elemental areas of the contrast image.

The photo-cell circuit contains a source of electro-motive force 27, a resistance 42 and the photo-electric cell 15, and is connected to the plate 35a of the condenser so that a positive potential is built up on this plate when the current flows in the photo-cell circuit. The current or rate of charge of this condenser in this circuit is proportional to the amount of light reaching the photo-cell.

The discharging circuit is connected to the plate 35a of the condenser and contains a source of electro-motive force 28 opposed to the source of electro-motive force 27 in the photo-cell circuit. The discharging circuit also contains means for maintaining the flow of current constant and means for stopping and starting the flow of current. These means consist of a vacuum tube 21 whose plate circuit constitutes a part of the discharging circuit. The tube 21 contains a grid 21a maintained at a constant potential and holding the flow of current in the plate circuit at a constant value greater than the greatest current in the photo-cell circuit. While greater than the current in the photo-cell circuit, the discharging current should be of the same order as that in the photo-cell circuit which requires that the tube 21 be operated at very low voltage. The strength of the discharging current may be regulated by a potentiometer 53 connected to the grid 21a and spanning the source of electro-motive force 28. The tube 21 also contains a control grid 21b which permits the plate current to flow when it is neutral with respect to the cathode of the tube and cuts off the flow of current when it is at a certain negative bias with respect to the cathode of the tube. This grid is connected by a variable tap 49 to the resistor 38 of the trigger circuit hereinafter described. When the current is flowing in the discharging circuit, it reduces the positive charge on the plate 35a, because the current in this circuit is greater than the current in the photo-cell by which it is opposed.

In addition to the charging and discharging circuits connected to the plate 35a of the condenser, a means for varying the condenser charge is connected with its other plate 35b. This means is the resistor 38 to which the plate 35b is connected by a variable tap 50 so that the existence of a voltage drop in the resistor 38 applies a negative potential to the plate 35b equal to the voltage drop between the high end 38a of the resistor 38 and the variable tap 50, while the absence of a voltage drop in the resistor 38 eliminates this negative charge on the plate 35b of the condenser.

The trigger circuit is actuated by the voltage across the condenser 35 in such manner as to cause a drop in potential in the resistor 38 only when the condenser voltage is below a predetermined value (which, for convenience, I shall term "the trigger value"). The trigger circuit includes a vacuum tube 22 whose grid is connected to the plate 35a of the condenser and whose plate circuit is connected to cause a flow of current through a resistor 37. The resistor 37 is connected through an oscillator and detector (enclosed in dotted lines in Fig. 1) to the resistor 38. The operation of this oscillator and detector (hereinafter described in detail) is such that it causes a flow of uni-directional current through the resistor 38 only when the flow of current through the resistor 37 is such as occurs in the plate circuit of the tube 22 when its grid is below the trigger value.

The control circuit for the recording lamp 16 is connected to the resistor 38 of the trigger circuit, and serves to keep the recording lamp 16 lighted only when there is a drop in potential in the resistor 38 or only when there is no drop in potential across this resistor, according to the setting of a reversing switch 40. The control circuit includes a source of electro-motive force 34, the recording lamp 16, and the plate circuit of the tube 26. Current flows in this circuit only when the grid of the tube 26 is neutral. The grid of the tube 26 is connected directly to the low end of the resistor 38 when the reversing switch is in the position marked "Neg." on Fig. 6, so that current flows through the recording lamp 16 only when there is no potential drop in the resistor 38. This results in making a negative contrast image of a positive subject on the drum 10. When the switch 40 is thrown to the position marked "Pos." in Fig. 6, the grid circuit of the tube 26 is connected across a resistor 39 in the plate circuit of a tube 25 whose grid is then connected to the low end of the resistor 38. In this case, the current in the plate circuit of the tube 26 and the recording lamp 16 flows only when there is no current in the plate circuit of the tube 25, that is, when there is a potential drop in the resistor 38. In this case, a positive contrast image is made.

The operation of the interconnected circuits which have been described is cyclic and may conveniently be described by beginning at the end of the discharge of the condenser 35. At this time, there is a potential drop in the resistor 38, as the condenser voltage is below the trigger value; if the reversing switch is in the positive position, the recording lamp is on and no current is flowing in the discharge circuit which includes the plate circuit of the tube 21. The condenser, therefore, become charged by the current flowing through the photo-cell circuit, and the charge continues to increase until it reaches the trigger value. At this point, the trigger circuit operates to stop the flow of current in the resistor 38 and eliminating the potential drop in this resistor. The elimination of the potential drop in the resistor 38 causes three effects: (1) It increases the charge of the condenser by a predetermined value depending upon the setting of the variable tap 50. (2) It eliminates the negative bias on the control grid 21b of the tube 21 and starts the flow of current in the discharge circuit. (3) It operates the control circuit to extinguish the recording lamp 16. After these three effects of the elimination of the voltage drop in the resistor 38, which take place simultaneously, the condenser voltage decreases, since the current in the discharging circuit is greater than the current in the photo-electric circuit which is opposing it. The discharge of the condenser continues until its voltage reaches the trigger value. The trigger circuit then starts a flow of current through the resistor 38, causing a potential drop in this resistor. The potential drop in the resistor 38 has three effects: (1) It decreases the charge in the condenser by the same amount as this charge was increased by the elimination of the voltage drop in the resistor 38. (2) It produces a negative bias on the control grid 21b of the tube 21 sufficient to stop the flow of current in the discharge circuit. (3) It lights the recording light 16. This completes the cycle and the charging of the condenser by the current in the photo-cell circuit begins again.

In the cyclic operation which has been described, the rate at which the condenser is charged is proportional to the amount of light reaching the photo-cell, as this determines the strength of the current in the photo-cell circuit. The rate at which the condenser is discharged is an inverse function of the amount of light reaching the photo-cell, since the photo-cell current opposes the constant current in the discharging circuit. The amount of time required for the discharging and charging of the condenser depends upon the discharging and charging rates and upon a fixed capacity of the condenser and the fixed voltage by which the condenser voltage is raised above and dropped below the trigger value by the voltage drop in the resistor 38 applied to the plate 35b of the condenser through the variable tap 50. Since the time for charging and discharging of the condenser determines the length of the black and white portions of each elemental area of the contrast image, the device which has been described operates to produce a positive contrast image such as that shown in Fig. 1 when the switch 40 is in "Pos." position.

When a dark tone area of the original is between the scanning lamp and the photo-cell, the photo-cell current is weak, so that the charging of the condenser to the trigger value takes a long period of time making a long black area on the contrast image, and the discharge of the condenser is rapid making a short white area. Because of the slowness of the charging, the whole cycle is long, and consequently the elemental area is long.

When a light tone area of the original lies between the scanning lamp and the photo-cell, the photo-cell current is large, charging the condenser rapidly and opposing the discharging current so that the discharge is slow. This also results in a long cycle producing a long elemental area which, in this case, contains a long white area and a short black area.

When a middle tone of the original is between the scanning lamp and the photo-cell, the current in the photo-cell circuit is approximately half the current in the discharge circuit, so that both the charging and discharging of the condenser are comparatively rapid, giving a short cycle producing a short elemental area which is half black and half white.

No black area of the contrast image can be less than a predetermined length, which is determined by the time required for the maximum photo-cell current to charge the condenser to the trigger value. At the same time, no white area can be less than a predetermined length, which is determined by the time required for the constant current in the discharge circuit to discharge the condenser when the photo-cell current is at its lowest value.

Adjustments may be made to determine the size of the elemental areas in the middle tones and the minimum sizes of the black and white areas as desired in the making of contrast images for etching printing plates. Best results are secured when the discharging current is made equal to the maximum photo-cell current plus the minimum photo-cell current. This or other desired adjustment of the discharging current may be made as follows:

The proportion of black area in the contrast image is indicated by a milliammeter 46 which is connected in the recording lamp circuit and provided with a variable shunt 48 which is adjusted so that the milliammeter reads 100 when the recording light 16 is lighted without interruption, a condition which may be attained by closing the switch 51 to maintain a constant potential on the grid of tube 26. The switch 51 is then opened and the indications of the milliammeter 46 are then used as a guide in adjusting the photo-cell current and the discharging current. The adjustment is made after a positive continuous-tone image has been wrapped around the cylinder 10. The darkest tone of this image is moved between the scanning lamp 13 and the photo-cell 15 with the reversing switch 40 in positive position. The strength of the photo-cell current is then adjusted by adjusting the brightness of the scanning lamp 13, for example by a rheostat 47, until the reading of the milliammeter 46 equals the percentage of black area desired to represent the darkest tone of the original, for example 95%. The lightest portion of the continuous-tone original is then moved between the scanning lamp 13 and the photo-cell 15, and the discharging current is adjusted by means of the potentiometer 53 until the reading of the milliammeter 46 is equal to the percentage of black desired to represent the lightest tone of the original, for example 5%. It is desirable to select the percentages so that 100 minus the percentage selected for the darkest tone equals the percentage selected for the lightest tone, as this results in making the discharging current equal to the sum of the maximum and minimum photo-cell currents. After the relation of the minimum size white and black areas to the size of the elemental area has been adjusted in this manner, the size of the elemental areas is adjusted by varying the position of the variable tap 50 on the resistor 38 to control the frequency of the charging and discharging of the cycle of the condenser 35. The adjustment is most desirably such as makes the elemental areas in the middle tones about equal in size to the elemental areas of an ordinary half-tone contrast image used for the sort of plate for which the contrast image made on the apparatus is to be used.

A further feature of the apparatus illustrated consists in a means for indicating the total amount of black area in a contrast image produced by the apparatus. This is of value since it enables a printer using a plate made from such an image to know the area of the printed plate which must be covered with ink without the experimentation necessary to determine this as in using ordinary printing plates. The means for indicating the total black area consists of an ampere hour meter 60 connected in the circuit of a recording lamp 16. The number of ampere hours indicated by this meter during the making of a positive contrast image on the apparatus, when divided by the number of ampere hours which would be required to burn the recording lamp 60 for the same length of time gives the proportion of black area in the contrast image.

In describing the operation of the device, I have referred to placing a positive continuous-tone image on the drum 10 and producing a positive contrast image when the reversing switch 40 is in "Pos." position and a negative contrast image when the reversing switch 40 is in "Neg." position. It should, of course, be understood that, if desired, a negative continuous-tone image may be placed upon the drum 10 and that, in this case, a positive contrast image will be obtained by placing the reversing switch 40 in the "Neg." position and a negative contrast image by placing the reversing switch 40 in the "Pos." position.

The operation of the oscillator and detector enclosed in dotted line in Fig. 1 is as follows:

When sufficient current flows through resistor 37, the grid of tube 23 is held at a negative potential sufficient to prevent a current in the plate circuit of this tube. When the current through resistor 37 decreases, there is a corresponding increase in the potential of the grid of tube 23. This causes the plate current of this tube to increase. The plate current flows through the primary of transformer 41. This induces a voltage in the secondary of the transformer which causes the grid of tube 23 to become more positive by virtue of the potential induced on one plate of condenser 36. This results in a further increase in the plate current and a correspondingly further increase in the grid voltage until saturation conditions are attained. At this point, the current through the primary of transformer 41 becomes momentarily constant and the secondary voltage drops to zero. This causes a decrease in the potential of the grid of tube 23, which produces a corresponding reduction in the current through the primary of transformer 41. This induces in the secondary of the transformer a voltage of the opposite sign and tends to make the grid of tube 23 even more negative. This process continues until the grid of tube 23 becomes so negative that the plate current ceases. Current then flows through the resistor 44 in such a direction as to again cause the potential of the grid of tube 23 to increase. These oscillations continue so long as the voltage drop across resistor 37 biases the grid of tube 23 above the cut-off potential of this tube.

Tube 24 is operated as a detector, its grid being biased normally slightly below the cut-off potential. During one-half of the oscillation period of tube 23, the voltage induced in the secondary of transformer 41 causes the grid of tube 24 to become positive allowing current to flow in the plate circuit through the resistor 38. Since the oscillations of tube 23 are at a radio frequency, the oscillations of this tube result in a pulsating unidirectional through resistor 38 which to all intent and purpose may be regarded and treated as a direct current. It is obvious to one skilled in the art that this oscillator and detector might be replaced by a direct current amplifier containing an odd number of stages.

"To avoid circumlocution in the claims which follow, we have adopted the expression 'altering the recording lamp to indicate a change from a condition in which the recording lamp directs its full brightness upon the film on the drum 11 to a condition in which the recording lamp directs no light upon the film.'"

What I claim is:

1. An apparatus for making a contrast image from a continuous-tone original, comprising a fixed intensity lamp arranged to scan the original, a recording lamp arranged to scan a photographic plate, a photo-electric cell receiving light from the fixed intensity lamp as modified by the original, an electric condenser, a circuit containing the photo-electric cell and a source of electro-motive force connected to the condenser to charge the same, a discharging circuit connected to the condenser and containing a source of electro-motive force and means for maintaining a constant current greater than the greatest current in the photo-electric cell circuit, and trigger means actuated when the voltage across the condenser rises to a predetermined value to increase the condenser voltage by a predetermined amount, to start a flow of current in the discharging circuit, and to alter the recording lamp in one sense, and actuated when the condenser voltage falls to said predetermined value to decrease the condenser voltage by said predetermined amount to stop the flow of current in the discharging circuit, and to alter the recording lamp in the other sense.

2. An apparatus for making a contrast image from a continuous-tone original, comprising a fixed intensity lamp arranged to scan the original, a recording lamp arranged to scan a photographic plate, a photo-cell positioned to receive light from the fixed intensity lamp as modified by the original, a condenser, a resistor, a photo-electric cell circuit including the photo-electric circuit, a source of electro-motive force and one plate of the condenser, a discharging circuit including said plate of the condenser, a source of electro-motive force and the plate circuit of a vacuum tube having a grid maintained at a constant potential and a control grid, a trigger circuit comprising a vacuum tube having its circuit connected to said plate of the condenser, and means controlled by the plate circuit of said tube to cause a voltage drop in the resistor when the voltage across the condenser is below a predetermined value, a connection between said resistor and the controlling grid of the tube in the discharging circuit which charges said grid so as to prevent the flow of current in the discharging circuit when there is a voltage drop in the resistor, a connection between the resistor and the plate of the condenser other than that to which the photo-electric cell circuit and the discharging circuit are connected, and a control circuit for the recording lamp connected to said resistor and actuated by the presence of a voltage drop in said resistor to alter said recording lamp.

3. An apparatus for making a contrast image from a continuous-tone original, comprising a fixed intensity lamp arranged to scan the original, a photo-electric cell positioned to receive the light of said lamp as modified by the original, a gaseous discharge recording lamp arranged to scan a photographic plate, means for alternately lighting and extinguishing said recording lamp, means connected to the photo-cell controlling said lighting and extinguishing means so that the amount of light falling on the photo-cell determines the length of the time periods during which said recording lamp is lighted, and means connected in series with the recording lamp for indicating the total amount of time during which said recording lamp has been lighted during a scanning operation.

4. An apparatus for making a contrast image from a continuous-tone original, comprising a fixed intensity lamp arranged to scan the original, a recording lamp arranged to scan a photographic plate, a photo-electric cell receiving light from the fixed intensity lamp as modified by the original, an electric condenser, a circuit containing the photo-electric cell and a source of electro-motive force, means controlled by the photo-cell for charging said condenser with a current proportional to the current in the photo-cell circuit, means controlled by the photo-cell for discharging said condenser with a current which is an inverse function of the current in the photo-cell circuit, and trigger means actuated when the voltage across the condenser rises to a predetermined value to actuate said condenser-discharging means and to alter the recording lamp in one sense, and actuated when the condenser voltage falls to a predetermined value to actuate said condenser-charging means and to alter the recording lamp in the other sense.

5. An apparatus for making a contrast image from a continuous-tone original, comprising a fixed intensity lamp arranged to scan the original, a recording lamp arranged to scan a photographic plate, a photo-electric cell receiving light from the fixed intensity lamp as modified by the original, an electric condenser, a circuit containing the photo-electric cell and a source of electro-motive force, means controlled by the photo-cell for charging said condenser with a current proportional to the current in the photo-cell circuit, means controlled by the photo-cell for discharging said condenser with a current which is an inverse function of the current in the photo-cell circuit, trigger means actuated when the voltage across the condenser rises to a predetermined value to increase the condenser voltage by a predetermined amount to actuate said condenser-discharging means and to alter the recording lamp in one sense, and actuated when the condenser voltage falls to said predetermined value to decrease the condenser voltage by said predetermined amount, to actuate said condenser-charging means and to alter the recording lamp in the other sense.

6. The method of reproducing pictures and the like, which comprises progressively and uniformly translating light intensities of different sections of the picture into a plurality of dark and light periods, the periods of both classes varying in duration upward from predetermined minimum lengths which for the dark periods occur in the lightest tones of the picture and for the light periods occur in the darkest tones of the picture.

7. The method of reproducing pictures and the like, which comprises progressively and continuously translating light intensities of different sections of the picture into a plurality of light impulses, said impulses being uniform in intensity and varying in duration above a predetermined minimum length occurring in the lightest tone of the picture, and the spacing periods separating said light impulses varying above a predetermined minimum length occurring in the darkest tone of the picture.

8. The method of reproducing pictures and the like, which comprises progressively projecting upon a photo-electric cell light from different sections of the picture, and utilizing the variations in said cell thereby produced to control an electric current in a manner to produce light impulses of uniform intensity varying in length above a predetermined minimum length occurring in the lightest tone of the picture and separated by spacing periods varying above a predetermined minimum length occurring in the darkest tone of the picture.

9. The method of transmitting pictures and the like, which comprises progressively translating light intensities of successive sections of the picture into electric impulses of uniform intensity, continuously varying the lengths of said impulses and the spacing of said impulses in accordance with the light and shade of said picture between the lightest and darkest tones thereof, and suitably recording said impulses.

10. In apparatus for reproducing pictures and the like, means for storing a predetermined quantity of electricity, a supply of electric energy, a light-controlled path for permitting discharge of electricity stored in said storing means, a light-controlled path for permitting the charging of electricity into said storing means from said source, and means operated in response to predetermined potential across said storing means to place said paths alternately into operation.

11. In apparatus for reproducing pictures and the like, means for storing a predetermined quantity of electricity, means for alternately charging and discharging said storing means, and light-controlled means controlling the rate of charging and the rate of discharging of said storing means.

12. The method of reproducing pictures and the like, which comprises progressively projecting upon a light-sensitive cell light from different sections of the picture and utilizing variations in said cell thereby produced to control the charging and the discharging of an electric condenser in accordance with the light and shade of said picture in such manner that the charging rate is increased and the discharging rate decreased with increase in the intensity of the light striking the cell, and suitably recording the charging and discharging of the condenser.

13. An apparatus for making a contrast image from a continuous-tone image, comprising a fixed intensity lamp arranged to scan the original, a photo-electric cell positioned to receive light from said lamp as modified by the original, a recording lamp arranged to scan a photographic plate, means for alternately lighting and extinguishing said recording lamp, and means connected to the photo-electric cell controlling said lighting and extinguishing means so that variation in the amount of light falling on the photo-electric cell causes continuous variations in the lengths of the periods during which said recording lamp is lighted and the periods during which said recording lamp is extinguished in accordance with the variation in tone of the continuous-tone image between the lightest and darkest tones thereof.

14. The method of reproducing pictures and the like, which comprises progressively and uniformly translating the light intensity of different sections of the picture into a plurality of dark and light periods, the dark periods being of a minimum length in the lightest portion of the picture and the light periods being of a minimum length in the darkest portion of the picture and the periods of both classes varying in length for the intermediate tones of the picture and having equal lengths greater than their minimum lengths in the middle-tone areas of the picture.

ARTHUR C. HARDY.

CERTIFICATE OF CORRECTION.

Patent No. 2,136,340. November 8, 1938.

ARTHUR C. HARDY.

It is hereby certified that error appears in the printed specification of the above numbered patent requiring correction as follows: Page 4, second column, line 57, for "ciircuit" read circuit; page 5, second column, line 36, before the words "To avoid" strike out the quotation mark; line 37, strike out the single quotation mark before "altering" and insert instead a double quotation mark; line 42, strike out the single quotation mark after "film"; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.

the like, which comprises progressively projecting upon a light-sensitive cell light from different sections of the picture and utilizing variations in said cell thereby produced to control the charging and the discharging of an electric condenser in accordance with the light and shade of said picture in such manner that the charging rate is increased and the discharging rate decreased with increase in the intensity of the light striking the cell, and suitably recording the charging and discharging of the condenser.

13. An apparatus for making a contrast image from a continuous-tone image, comprising a fixed intensity lamp arranged to scan the original, a photo-electric cell positioned to receive light from said lamp as modified by the original, a recording lamp arranged to scan a photographic plate, means for alternately lighting and extinguishing said recording lamp, and means connected to the photo-electric cell controlling said lighting and extinguishing means so that variation in the amount of light falling on the photo-electric cell causes continuous variations in the lengths of the periods during which said recording lamp is lighted and the periods during which said recording lamp is extinguished in accordance with the variation in tone of the continuous-tone image between the lightest and darkest tones thereof.

14. The method of reproducing pictures and the like, which comprises progressively and uniformly translating the light intensity of different sections of the picture into a plurality of dark and light periods, the dark periods being of a minimum length in the lightest portion of the picture and the light periods being of a minimum length in the darkest portion of the picture and the periods of both classes varying in length for the intermediate tones of the picture and having equal lengths greater than their minimum lengths in the middle-tone areas of the picture.

ARTHUR C. HARDY.

CERTIFICATE OF CORRECTION.

Patent No. 2,136,340. November 8, 1938.

ARTHUR C. HARDY.

It is hereby certified that error appears in the printed specification of the above numbered patent requiring correction as follows: Page 4, second column, line 57, for "ciircuit" read circuit; page 5, second column, line 36, before the words "To avoid" strike out the quotation mark; line 37, strike out the single quotation mark before "altering" and insert instead a double quotation mark; line 42, strike out the single quotation mark after "film"; and that the said Letters Patent should be read with this correction therein that the same may conform to the record of the case in the Patent Office.

Signed and sealed this 14th day of February, A.D. 1939.

Henry Van Arsdale.

(Seal) Acting Commissioner of Patents.